United States Patent [19]
Komatsu et al.

[11] Patent Number: 5,529,143
[45] Date of Patent: Jun. 25, 1996

[54] ENGINE ROOM STRUCTURE OF AUTOMOTIVE VEHICLE

[75] Inventors: Nobuhiro Komatsu; Satoshi Fujita; Yukiichiro Shimada; Masayoshi Sannomiya, all of Hiroshima-ken, Japan

[73] Assignee: Mazda Motor Corporation, Hiroshima, Japan

[21] Appl. No.: 630,649

[22] Filed: Dec. 20, 1990

[30] Foreign Application Priority Data

Dec. 27, 1989 [JP] Japan ............... 1-152836 U

[51] Int. Cl.⁶ .................................... B60K 5/021
[52] U.S. Cl. ........................................ 180/297
[58] Field of Search ............... 180/297, 79, 148, 180/146, 147, 79.1, 79.3, 234, 132, 291

[56] References Cited

U.S. PATENT DOCUMENTS

| | | | |
|---|---|---|---|
| 4,263,980 | 4/1981 | Harlow, Jr. et al | 180/297 |
| 4,778,026 | 10/1988 | Uchida et al. | 180/297 |
| 5,078,229 | 1/1992 | Kikuchi et al. | 180/297 |

FOREIGN PATENT DOCUMENTS

| | | |
|---|---|---|
| 61-19936 | 6/1986 | Japan . |
| 0273128 | 11/1987 | Japan . |
| 64-47483 | 3/1989 | Japan . |

*Primary Examiner*—Richard M. Camby
*Attorney, Agent, or Firm*—Fish & Richardson

[57] ABSTRACT

An engine room structure of an automotive vehicle is provided with a power transmission unit consisting of, for example, a transfer, between a pair of left-hand and right-hand front side frames, a front axle extending outside from the power transmission unit in the transverse direction of the vehicle body. The steering rack functioning as an element of the front-wheel steering mechanism is so disposed within the engine room as to extend in the transverse direction of the vehicle body and as to lie in the position underneath the spower transmission unit. In other words, the power transmission unit is disposed in the position above the steering rack. This arrangement for the power transmission unit and the steering rack can provide a space between them, thereby lowering the positions of the front side frames.

14 Claims, 13 Drawing Sheets

ENGINE ROOM STRUCTURE OF AUTOMOTIVE VEHICLE

BACKGROUND OF THE INVENTION

1. Field of the Invention

The present invention relates to an engine room structure of an automotive vehicle and, more particularly, to such an engine room structure of the automotive vehicle as capable of disposing a pair of left-hand and right-hand front side frames with a high freedom of disposition in the vertical direction of the vehicle body within the engine room.

2. Description of Related Art

Japanese Utility Model Laid-open Publication No. 47,483/1989 discloses the structure of an engine room in which a pair of left-hand and right-hand front side frames extending in the longitudinal direction of the vehicle body are disposed on the respective side walls of the engine defined by and divided from the vehicle chamber by the dash panel. It is common that the engine unit or the front wheel suspension unit is loaded directly or indirectly on the front side frames.

It is to be noted, however, that for the front-wheel drive vehicle in which at least the front wheels are driven or for the four-wheel drive vehicle in which the rear wheels are driven as well as the front wheels, a power transmission mechanism for transmitting the power to the front wheels is disposed in the engine room. More specifically, a front axle is so disposed as to extend from the engine unit interposed between the left-hand and right-hand front side frames toward the outside in the transverse direction of the vehicle body and so to associate with the left-hand and right-hand front wheels, respectively, through a universal joint. It is noted as a matter of course that the engine room is provided with a front-wheel steering mechanism to steer the front wheels to the left or to the right by means of a steering wheel disposed at the driver's seat.

Therefore, it can be noted that the automotive vehicle in which at least the front wheels are to be driven is provided within the engine room with a front axle as a member extending and bridging between the left-hand and right-hand front wheels in the transverse direction of the vehicle body and with a steering rack as an element of the front-wheel steering mechanism. Description on disposition of the front axle and steering rack for the conventional automotive vehicle will be described hereinafter with reference to FIG. 14.

As shown in FIG. 14, reference numeral 100 denotes an engine room and reference numeral 102 denotes a vehicle chamber, and the engine room 100 and the vehicle chamber 102 are defined and divided by a dash panel 104. The engine 106 loaded in the engine room 100 is provided with a transmission unit 108 at its side in the transverse direction of the vehicle body, for example, in case of the engine to be so loaded as for its output shaft to lie in the transverse direction of the vehicle body. To the rear end of the transmission unit 108 is connected a power transmission member 110 from which the front axle 112 is disposed to extend toward the outside in the transverse direction of the vehicle body.

For the conventional system, the steering rack 114 functioning as one element of the front-wheel steering mechanism is located above the power transmission unit 110. The conventional position of disposition of the steering rack 114 is indicated by the solid line as shown in FIG. 14. It is therefore necessary from the viewpoint of designing the vehicle body to dispose the front side frame 116 at the height so as to avoid interference with the steering rack 114.

SUMMARY OF THE INVENTION

Therefore, the present invention has the object to provide an engine room structure of an automotive vehicle in which a pair of left-hand and right-hand front side frames are disposed on the respective side walls of the engine room with an improved freedom of disposition in the vertical direction of the vehicle body.

In order to achieve the aforesaid object, the present invention consists of the engine room structure of the automotive vehicle, comprising:

- a pair of left-hand and right-hand front side frames disposed to left-hand and right-hand side walls of an engine room, respectively;
- a power transmission unit interposed between the left-hand and right-hand front side frames; and
- a front axle so disposed as to associate with the power transmission unit and so to extend toward the outside of a vehicle body in the transverse direction thereof;
  wherein the power transmission unit is disposed in a position higher than the steering rack.

Description will be made of the effect of the aforesaid structure of the engine room for the automotive vehicle with reference to FIG. 14. The construction of the present invention is such that the steering rack 114 is disposed underneath the power transmission unit 110, as indicated by the virtual line in FIG. 14.

With the lowest height H of the vehicle body from the ground surface taken into consideration, it is considered to dispose the power transmission unit 110 in such a higher position as indicated by the virtual line in FIG. 14. This disposition is considered to be performed by disposing the power transmission unit 110 and the steering rack 114 in the order opposite to the conventional order of disposition within the space having the height H as high as the conventional one in the order opposite to the conventional order of this disposition.

This arrangement allows at least the space having the height L0 between the upper surface 110a of the power transmission unit 110 and the front axle 112 to be utilized, as will be apparent from FIG. 14. When the front side frame 116 is disposed to a lower position than the conventional one by taking advantage of the space having the height L0, the position of disposition of the bonnet can be lowered with ease. Further, when the sectional area of the front side frame 116 is enlarged at its lower portion by taking advantage of the space having the height L0, the rigidity of the vehicle body can be improved, for example, upon a car crash or input from the suspension.

Other objects, features and advantages of the present invention will become apparent in the course of the description of the preferred embodiments, which follows, with reference to the accompanying drawings.

DETAILED DESCRIPTION OF THE PREFERRED EMBODIMENTS

The present invention will be described in more detail with reference to the accompanying drawings.

Figure 1:
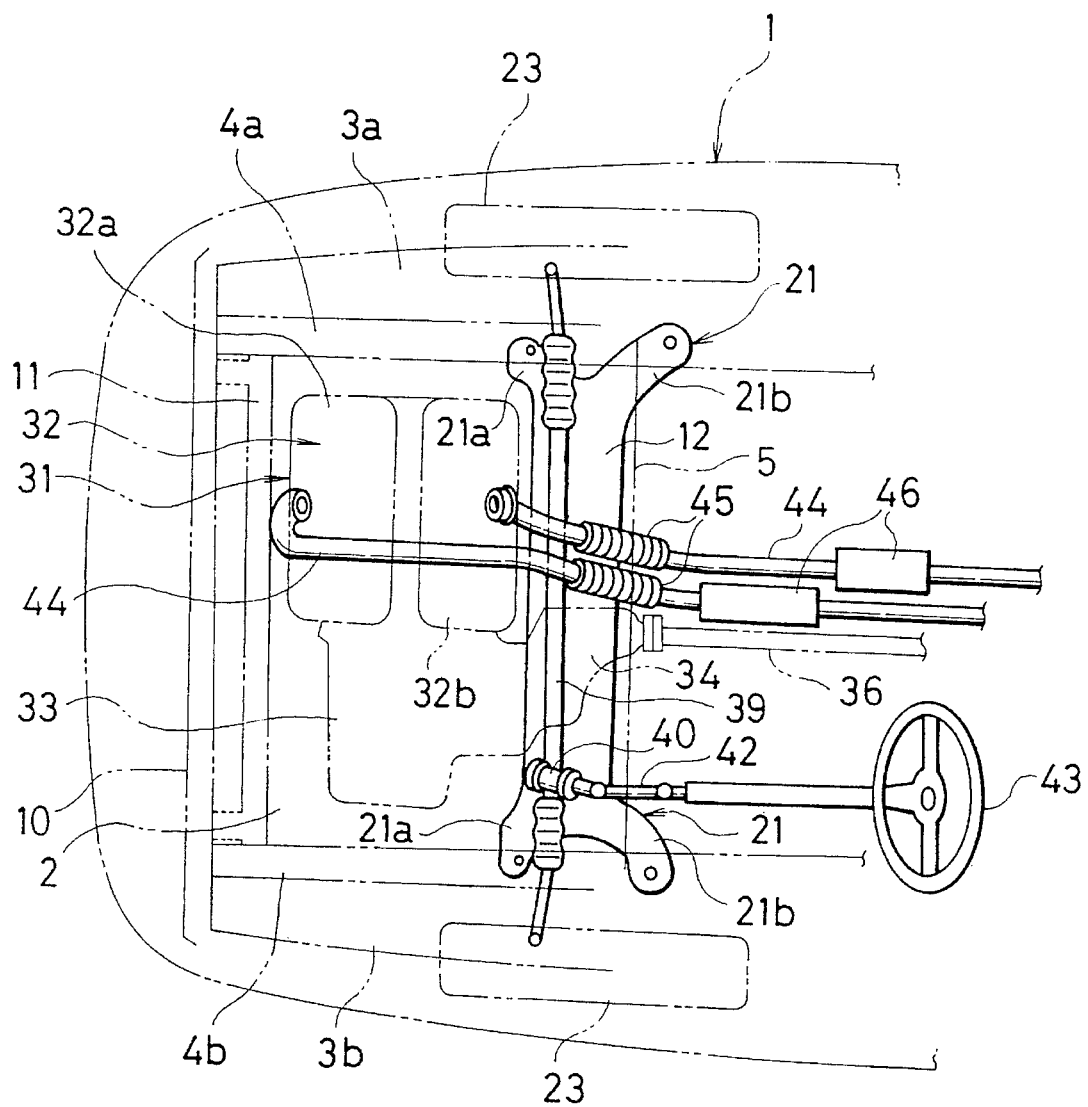
FIG. 1 is a plan view showing the structure of the forward portion of the vehicle body.
Figure 2:
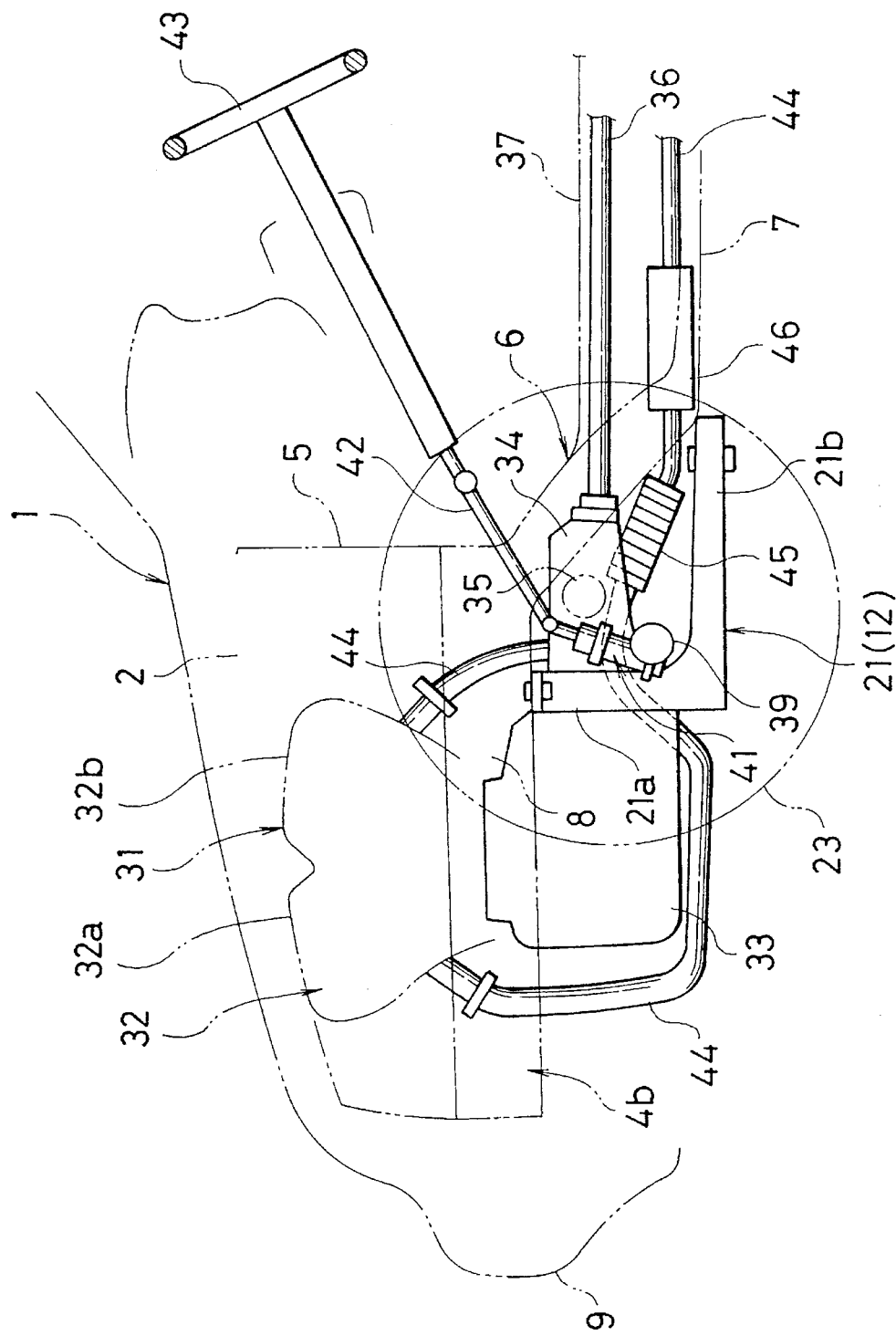
FIG. 2 is a side view of the structure of the forward portion of the vehicle body.

As shown in FIGS. 1 to 10, reference numeral 1 denotes a vehicle body which in turn is provided with an engine room 2 at a forward portion thereof forward of its vehicle chamber. On left-hand and right-hand front side walls 3a and 3b of the engine room 2 are mounted left-hand and right-hand front side frames 4a and 4b, respectively, which extend in the longitudinal direction of the vehicle body. As shown specifically in FIGS. 2, 6, 7 and 9, each of the front side frames 4a and 4b has a kickup frame section 6 in the vicinity of a dash panel 5. Each of the front side frames 4a and 4b is constructed such that its forward portion 8 thereof forward of the kickup frame section 6 is so formed as to lie in a position higher than its rearward portion 7 thereof rearward of the kickup frame section 6. More particularly, the forward portion 8 of each of the front side frames 4a and 4b forward of the kickup frame section 6 is so formed as to lie in the height as high as a bumper 9 and as to allow its front end face to be directed to the bumper 9, as shown in FIG. 2.

Figure 3:
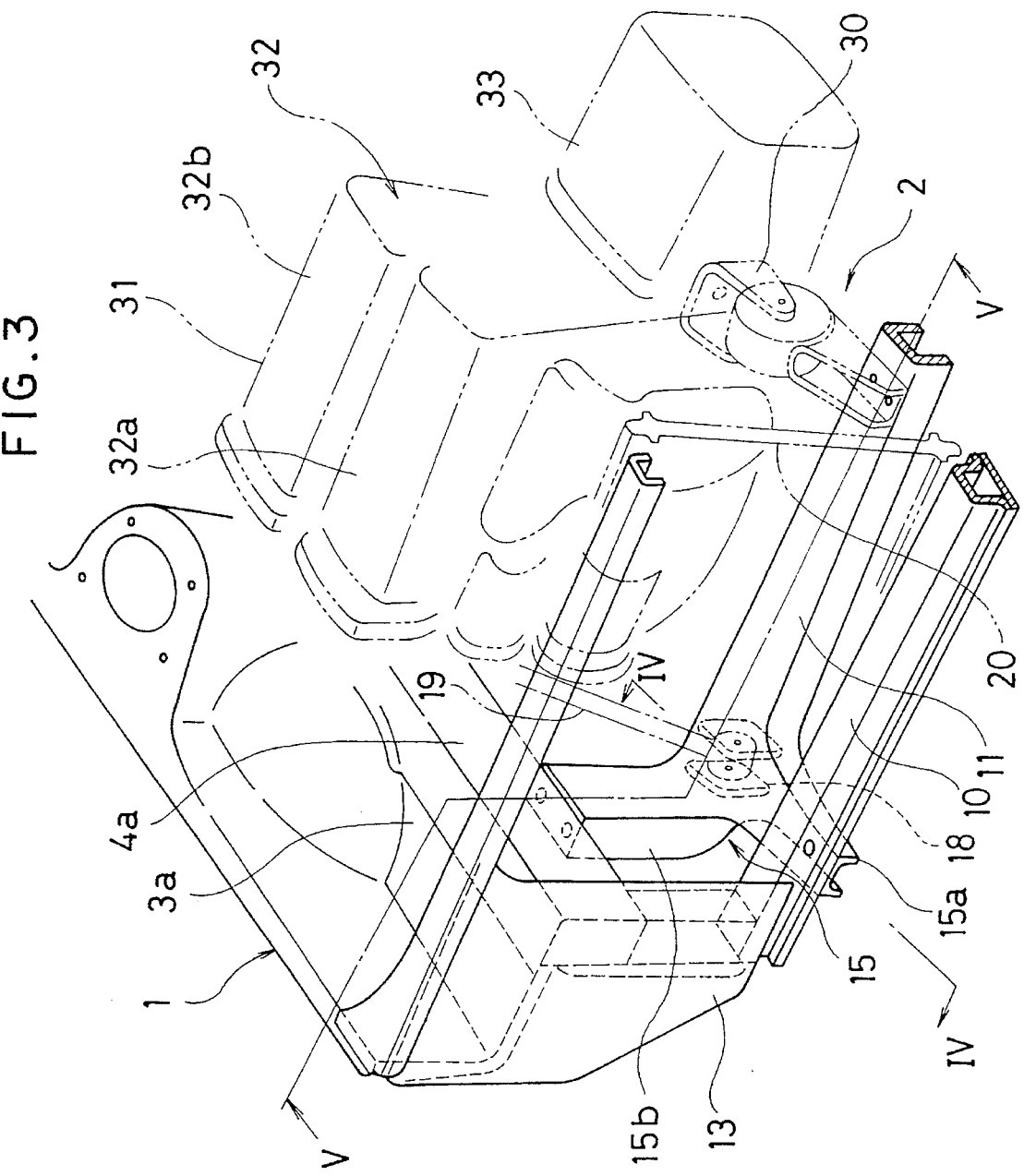
FIG. 3 is a perspective view of the structure of the forward portion of the vehicle body.
Figure 4:
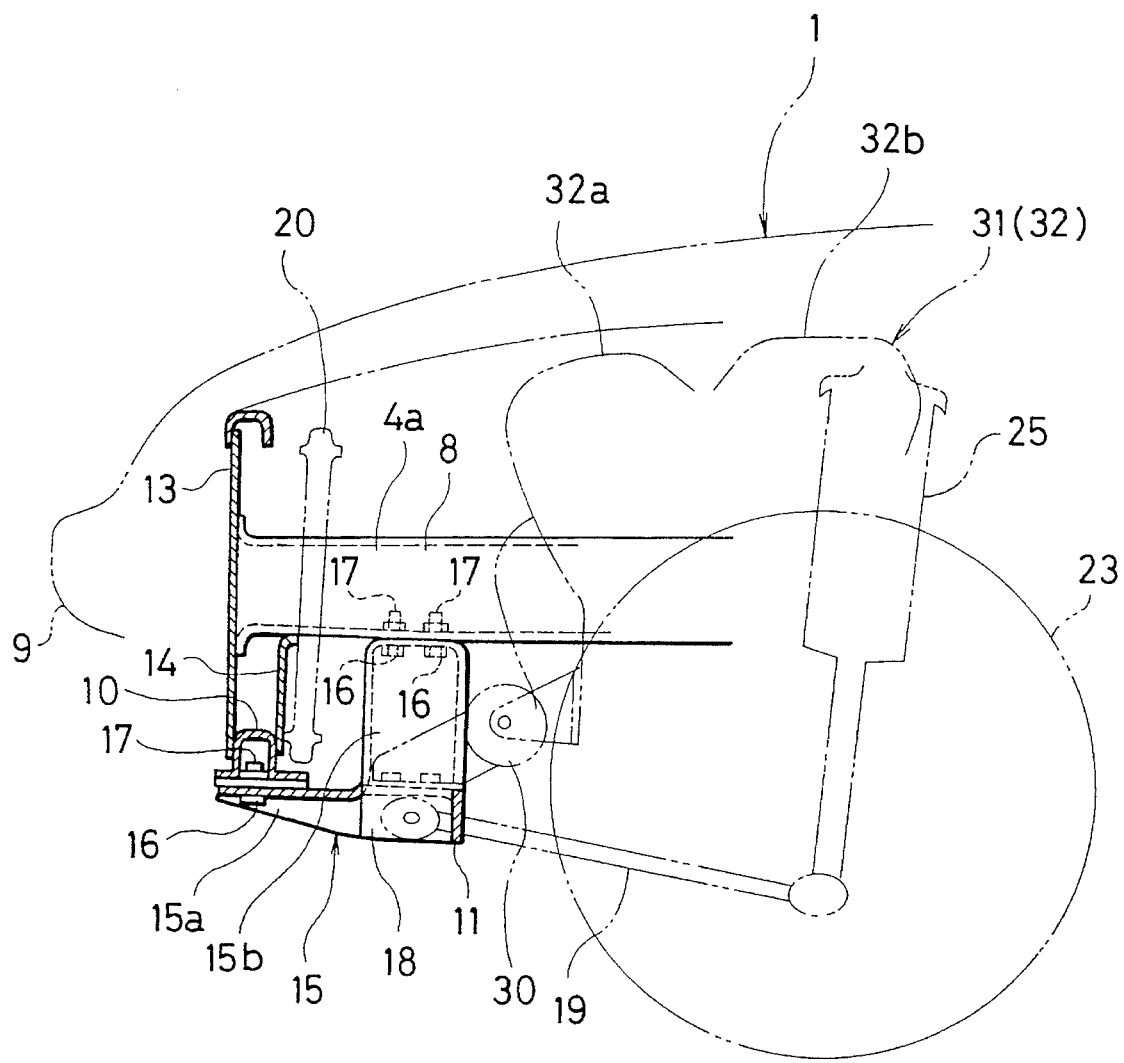
FIG. 4 is a sectional view taken along line IV—IV of FIG. 3.
Figure 6:
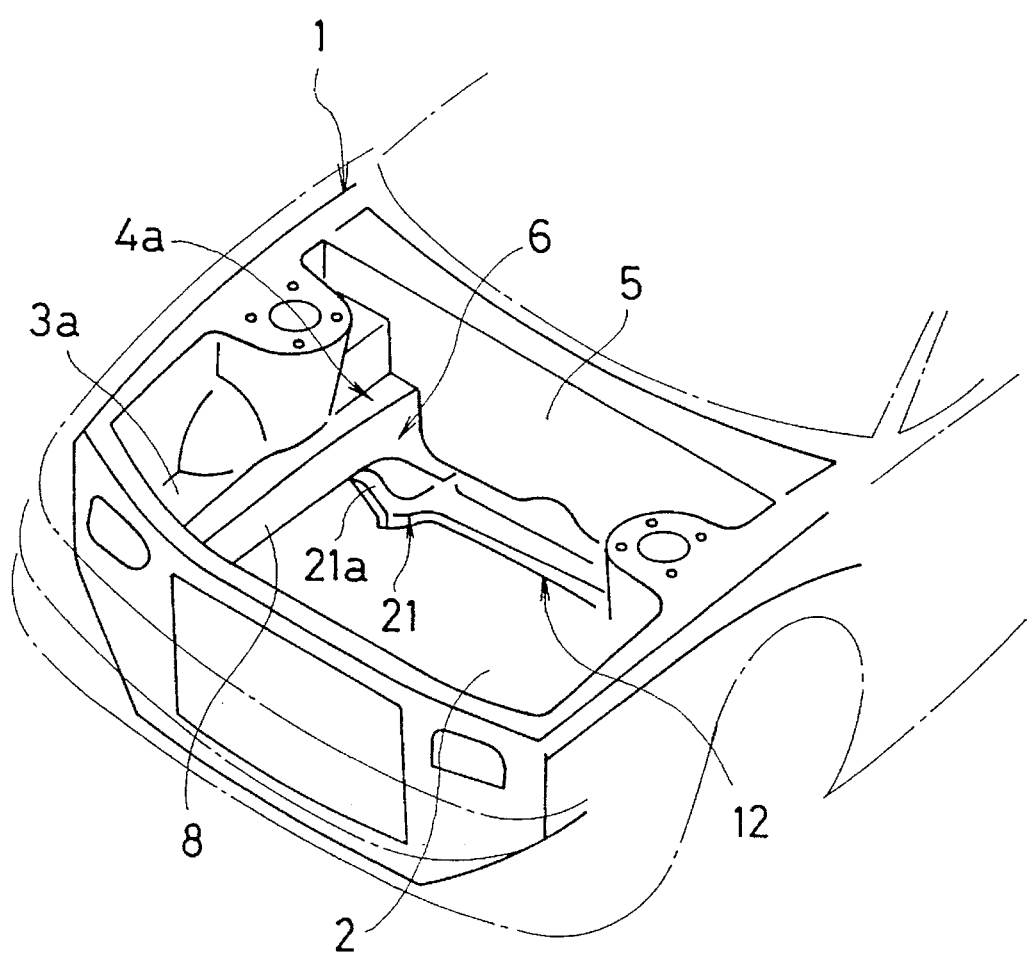
FIG. 6 is a schematic representation in perspective showing the position of disposing a suspension cross member.

As shown in FIGS. 3 and 6, between a pair of the left-hand and right-hand front side frames 4a and 4b, there are disposed a first cross member 10, a second cross member 11 and a suspension cross member 12, which are arranged in this order from the front side to the rear side of the vehicle body. As shown in FIGS. 3 and 4, the first cross member 10 is supported transversely and horizontally by the front end portion of each of the left-hand and right-hand front side frames 4a and 4b through a front plate 13 and a supporting plate 14 underneath the front end portion thereof. The first cross member 10 has flat surfaces at both of the upper and lower faces.

Figure 5:
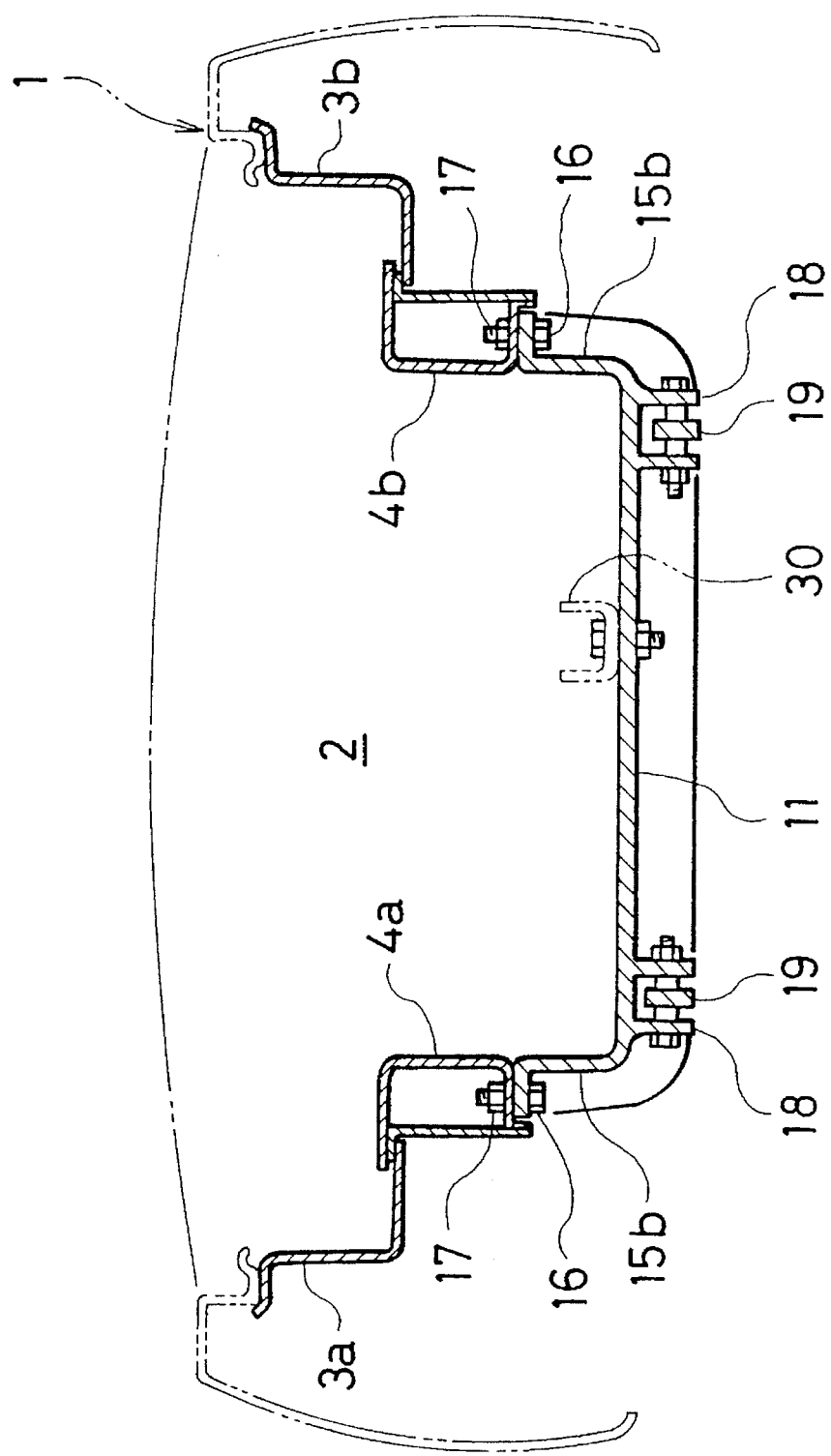
FIG. 5 is a sectional view taken along line V—V of FIG. 3.

As shown in FIGS. 3 to 5, the second cross member 11 is in the form of a trough having a generally c-letter shaped section and it is so disposed as to face its open face of the generally squarely c-letter shaped section downwards and to lie in a position backward of and parallel to the first cross member 10. The second cross member 11 has two forked end portions 15 at its both end portions. Each of the forked end portion 15 is so constructed that one of its branched cross member sections, 15a, is disposed extending toward the front portion of the vehicle body, or a forward branch section, and the other of its branched cross member sections, 15b, is disposed extending backwards and upwards, or a rearward branch section. The forward branch section 15a is secured with bolts 16 and nuts 17 to the lower face of the first cross member 10, while the rearward branch member section 15b is secured with bolts 16 and nuts 17 to the lower face of each of the front side frames 4a and 4b. The second cross member 11 has a support section 18 on its both sides at its lower face portion, and each of the support sections 18 supports a suspension rod 19. Between the second cross member 11 and the first cross member 10 is disposed a radiator 20.

The suspension cross member 12 is disposed in a position forward of the dash panel 5 forward of the vehicle chamber, as shown in FIGS. 1, 2 and 6 to 9. The suspension cross member 12 has a forked end portion 21 at each of its both end portions and the forked end portion 31 is so arranged as to branch the respective end portion of the suspension cross member 12 into two sections including a forward branch section 21a and a rearward branch section 21b. The forward branch section 21a of the forked end portion 21 is so disposed as to lie in the longitudinal direction of the vehicle body and to allow its front top end, to direct toward the forward portion of the vehicle body from the reference line set on the center line extending along the lengthwise direction of the forked end portion 21, while a rearward branch section 21b of the forked end portion 21 is so disposed as to lie in the longitudinal direction of the vehicle body and to allow its rear top end to direct toward the rearward portion thereof from the reference line. The forward branch section 21a and the rearward branch section 21b of the left-hand forked end portion 21 are mounted to the kickup frame section 6 of the left-hand front side frame 4a so as to vertically offset them, while the forward branch section 21a and the rearward branch section 21b of the right-hand forked end portion 21 are likewise mounted so as to allow them to offset the kickup frame section 6 of the right-hand forked end portion 21 in the vertical direction of the vehicle body. Further, the forward branch section 21a of the forked end portion 21 is mounted to the kickup frame section 6 of each of the front side frames 4a and 4b so as to lie in the position higher than and to be offset with the rearward branch section 21b thereof.

Figure 7:
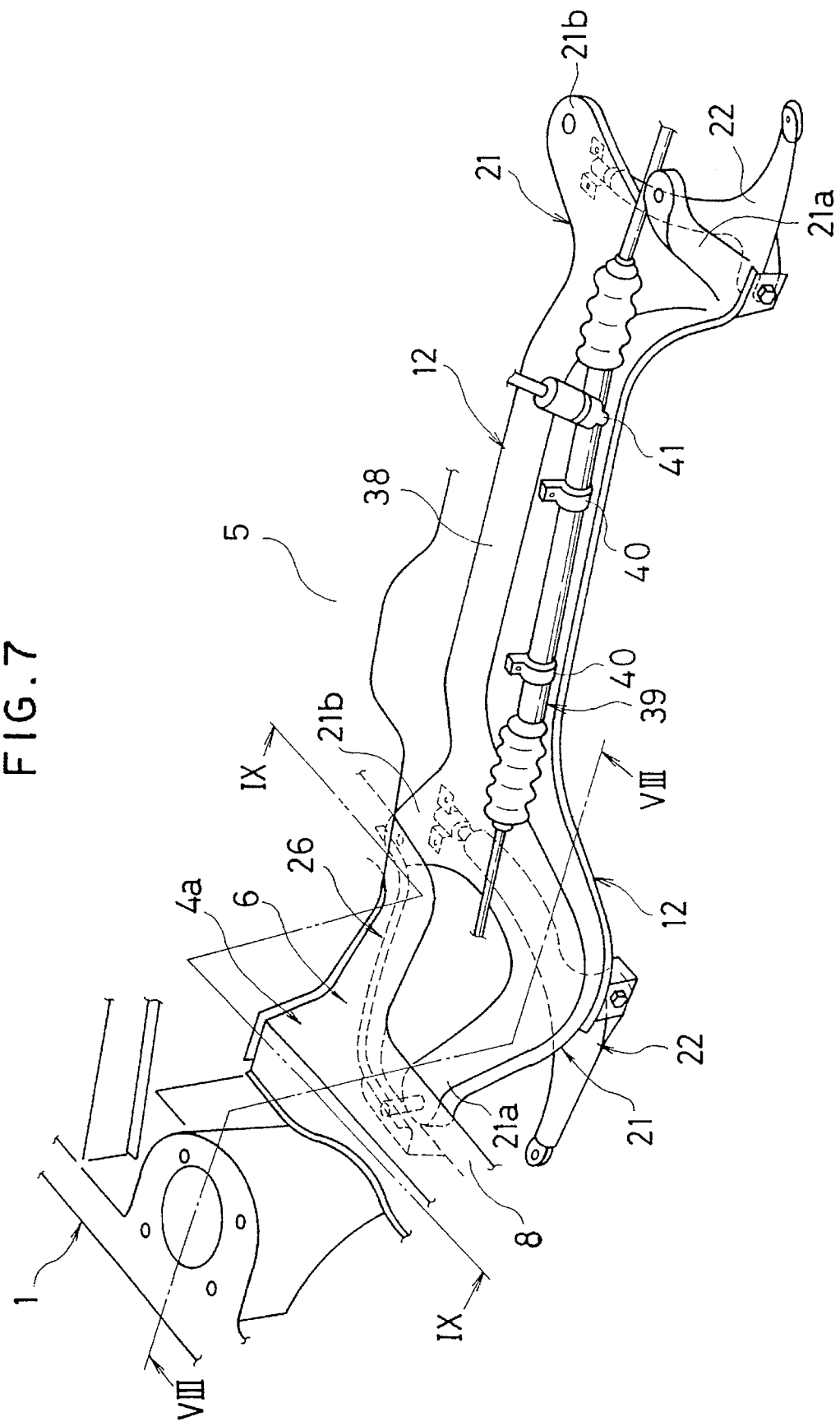
FIG. 7 is an enlarged perspective view showing the essential portion of FIG. 6.
Figure 8:
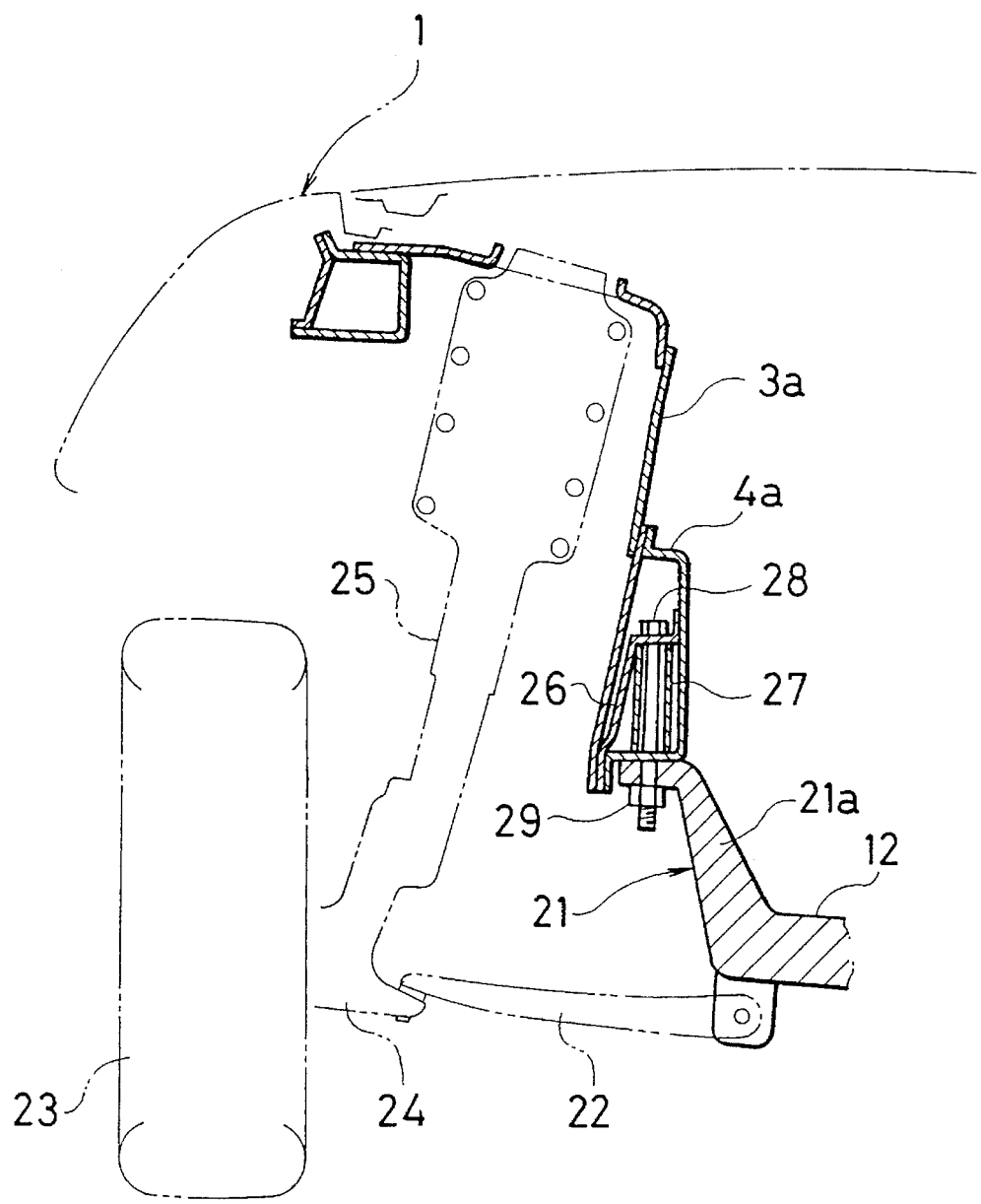
FIG. 8 is a sectional view taken along line VIII—VIII of FIG. 7.
Figure 9:
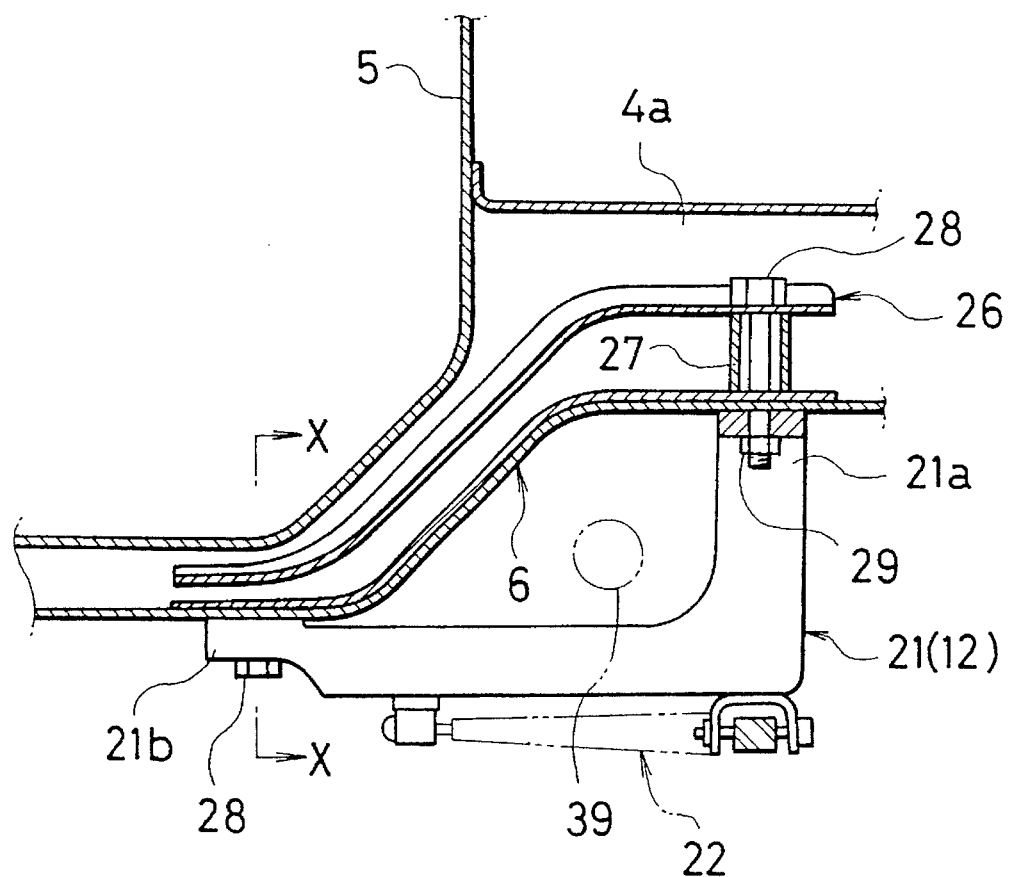
FIG. 9 is a sectional view taken along line IX—IX of FIG. 7.
Figure 10:
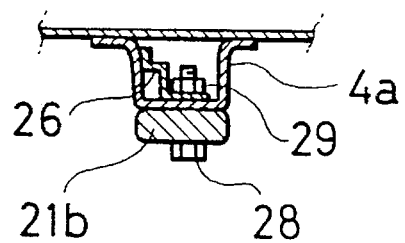
FIG. 10 is a sectional view taken along line X—X of FIG. 9.

As shown in FIGS. 7 to 9, a suspension arm 22 is pivotably mounted to the lower face of each of the end portions of the suspension cross member 12, namely, to the lower face of a base end portion of the forked end portion 21. The suspension arm 22 is in turn supported at its top end portion by a front wheel supporting member 24 for supporting the front wheel, thereby functioning as a suspension link and aligning the front wheel 23. As a result, a damper (a shock absorber) 25 interposed between each of the side walls 3a and 3b of the engine room 2 and the front wheel supporting member 24 is caused to function as no suspension link, so that the damper 25 is so disposed as to lean inside in the transverse direction of the vehicle body, as shown in FIG. 8, thereby lowering the upper position of the damper 25 and making the height of the bonnet lower. However, a closed cross section of each of the front side frames 4a and 4b is caused to be narrowed at the portion of the kickup frame portion 6, as shown in FIGS. 7 to 10, as the damper 25 is disposed to lean inside the vehicle body. As shown in FIGS. 7 to 10, a reinforcement member 26 is disposed to extend in the direction of extension of each of the front side frame 4a and 4b at its kickup frame portion 6 in the closed cross section of each of the front side frame 4a and 4b, thereby reinforcing the kickup frame portion 6. The reinforcement member 26 is further so disposed as to cross the closed cross section of each of the left-hand and right-hand front side frames 4a and 4b in the obliquely transverse direction, and a sleeve 27 is interposed between the reinforcement member 26 and the lower portion of each of the front side frames 4a and 4b on the forward side of the vehicle body forward of the reinforcement member 26. At the forward portion of the vehicle body forward of the reinforcement member 26, a bolt 28 is passed through the reinforcement member 26, the sleeve 27 and the lower portion of each of the front side frames 4a and 4b, and the forward branch section 21a of the forked end portion 21 is fixed to the lower face of each of the front side frames 4a and 4b through the bolt 28 and a nut 29. At the rearward portion of the vehicle body rearward of the reinforcement member 26, the rearward branch section 21b of the forked end portion 21 is fixed to the lower face of each of the front side frames 4a and 4b with a bolt 28 and a nut 29, as shown in FIG. 10.

As shown in FIGS. 3 to 5, a mounting member 30 is mounted to the second cross member 11. Likewise, a mounting member is mounted to each of the front side frames 4a and 4b and the suspension cross member 12, although not shown in the drawings. To these mounting members 30 is mounted a power plant 31 of a transversely mounting type (a transversely mounted engine), and the power plant 31 is loaded as a unit integrally to the vehicle body from the lower side of the vehicle body. The power plant 31 comprises a V-type engine 32, a transmission 33 to be mounted at the side portion of the engine 32, and a transfer 34 functioning as a power transmission mechanism to be disposed on the rearward side of the transmission 33. The transfer 34 is disposed in a position higher than conventional one. In this embodiment, the automotive vehicle is of a four-wheel drive type, and the transfer 34 is disposed in association with a front axle 35, as indicated by virtual circle in FIG. 2, and with a propeller shaft 36. The front axle 35 is disposed extending from the side of the transfer 34 toward the outside in the transverse direction of the vehicle body and in the position lower by a predetermined length from the uppermost portion of the transfer 34. The propeller shaft 36 is disposed extending from the rear portion of the transfer 34 toward the rearward portion of the vehicle body and the height of the propeller shaft 36 is higher than conventional one on the basis of the position of the transfer 34.

The suspension cross member 12 is located underneath the transfer 34 and has a rise portion 38 swelling upwards in a generally convex shape toward the transfer 34 at a middle portion in its lengthwise direction, as shown in FIG. 7. On the side face of the rise portion 38 of the suspension cross member 12 is mounted a steering rack 39 through a mounting 40. The steering rack 39 functions as a steering mechanism for steering the front wheel and is so disposed under the transfer 34 as to extend in the transverse direction of the vehicle body. The steering rack 39 is associated with a pinion 41 (a gear box) which in turn is associated with a steering wheel 43 through a steering shaft 42, as shown in FIGS. 1 and 2.

As shown in FIGS. 1 and 2, the V-type engine 32 has a front bank 32a and a rear bank 32b, to each of which is connected an exhaust piping 44. The exhaust piping 44 is so disposed as to lie at the side of the transfer 34 and then above the steering rack 39 and to enter a tunnel portion 37, as shown in FIG. 2. In other words, the exhaust piping 44 within the engine room is disposed extending backwards so as to lie across or over the steering rack 39, thereby permitting an effective use of a space created between the steering rack 39 and the front axle 35 in the vertical direction and, as a result, an effective disposition of an exhaust piping 39. By disposing the exhaust piping 44 over the steering rack 39, thermal deterioration of oil within the steering rack 39 can be prevented. More specifically, if the exhaust piping 44 would be disposed under the steering rack 39, the steering rack 39 is exposed directly to heat radiated upwards from the exhaust piping 44, so that oil is likely to be subject to thermal deterioration. It is therefore necessary to dispose a thermally insulating material between the steering rack 39 and the exhaust piping 44 in order to avoid such thermal problems. On the contrary, this embodiment does not require such a thermally insulating material because the steering rack 39 is disposed underneath the exhaust piping 44, so that heat resulting from the exhaust piping 44 may not exert an adverse influence upon the steering rack 39. It is further noted that the exhaust piping 44 is disposed underneath the propeller shaft 36 within the tunnel portion 37 and a flexible tube 45 and a catalyst 46 are disposed along its line within the exhaust piping 44.

In this embodiment, the steering rack 39 and the transfer 34 are disposed upwards in this order on the basis of the bottom surface of the vehicle body specifying the lowest height thereof from the ground surface, as described hereinabove, and the lowest height of the vehicle body is set as conventional. Therefore, unlike the instance wherein the transfer and the steering rack are disposed upwards in this order to the contrary, the height (length) from the uppermost portion up to the front axle 35 can be utilized so that the lower surfaces of the side frames can be lowered and the cross section thereof can be extended on the lower side. It can be noted that, in this engine room structure according to the present invention, the second cross member 11 has a forked end portion 15 at its both end portions. In this embodiment, the forward branch section 15a of the forked end portion 15 is disposed to be pivotable relative to the rearward branch section 15b thereof in the direction as indicated by the arrow in FIG. 4, or vice versa, upon a car crash from the front side of the vehicle body. Therefore, in this embodiment, the crash energy can be consumed, too, through the relatively pivotal movement, as well as it is received by the front side frames 4a and 4b, thereby enabling the crash energy to be absorbed more effectively to a great extent upon crash from the front side of the vehicle body.

Further, in the structure as described hereinabove, the suspension cross member 12 is provided at its both end portions with the forked end portions 21 which in turn are mounted to the respective kickup frame portions 6 of the left-hand and right-hand front side frames 4a and 4b. Further, the forward branch section 21a of the forked end portion 21 is vertically offset with the rearward branch section 21b thereof, thereby allowing the suspension cross member 12 to possess a sufficiently high rigidity against the suspension load from other directions as well as from the particular direction and improving the strength of the suspension cross member 12 against the suspension load from every direction to a more extent.

Furthermore, in the aforesaid structure, the steering rack 39 is disposed under the transfer 34 so that the front side frames 4a and 4b can be extended at lower side by taking advantage of the space between the uppermost face of the transfer 34 and the front axle 35, thereby improving the strength of the front side frames 4a and 4b to such an extent than ever without causing any new problems. Therefore, performance against crash can be improved, thereby improving the strength for supporting the suspension cross member 12.

Figure 11:
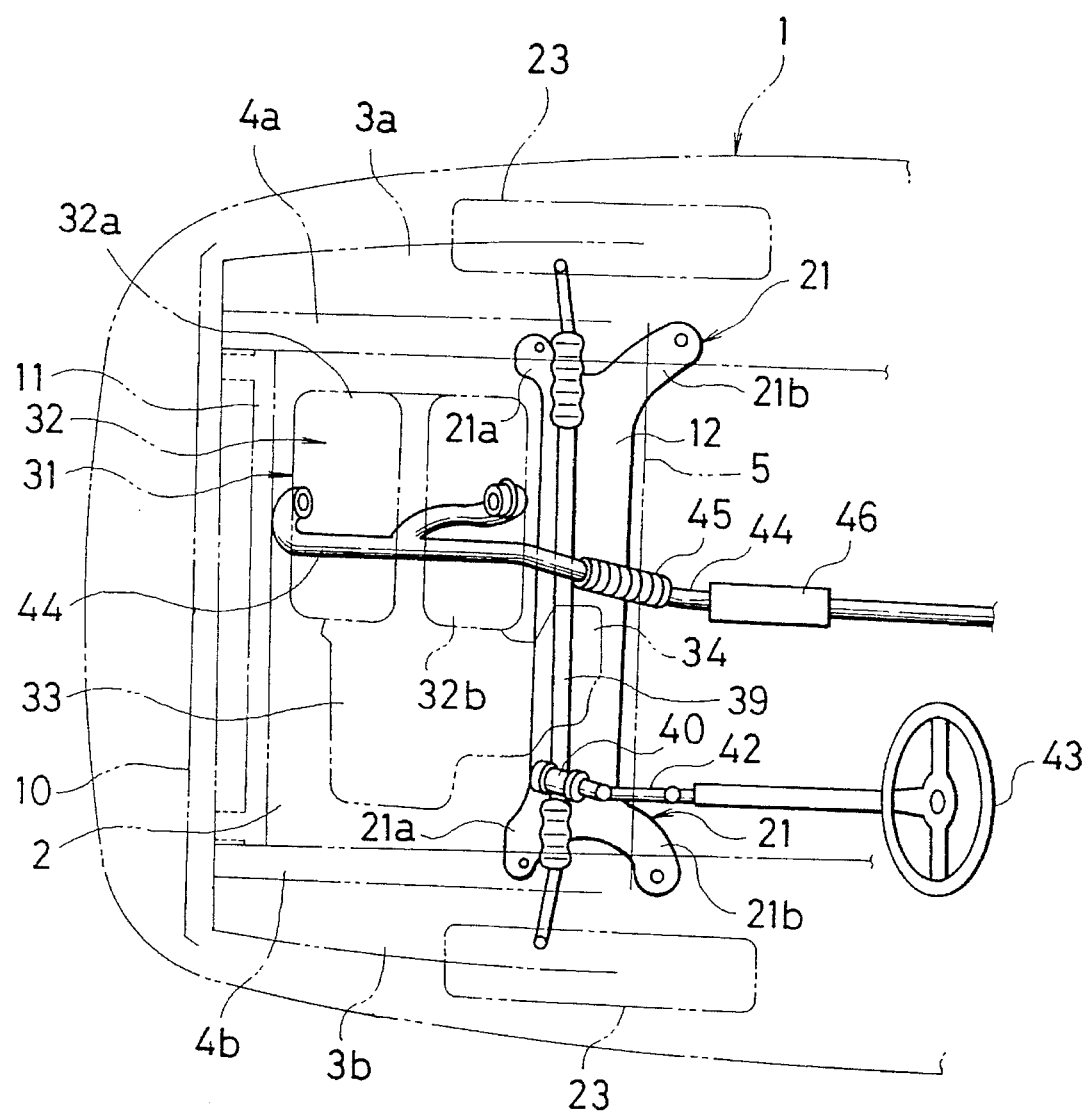
FIG. 11 is a plan view corresponding to FIG. 1, in which the invention is directed to a second embodiment according to the present invention.
Figure 12:
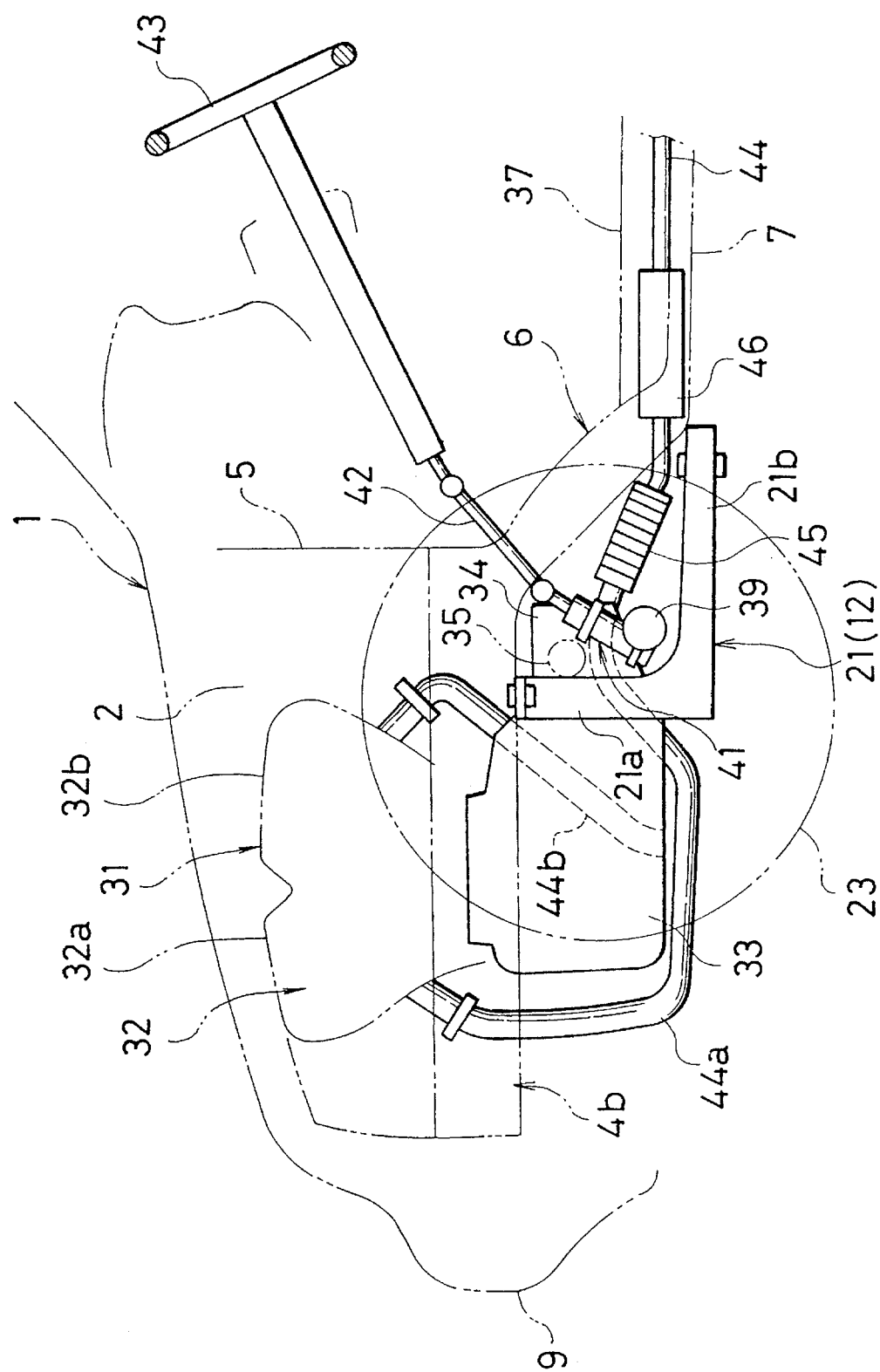
FIG. 12 is a plan view corresponding to FIG. 2, in which the invention is directed to the second embodiment according to the present invention.
Figure 13:
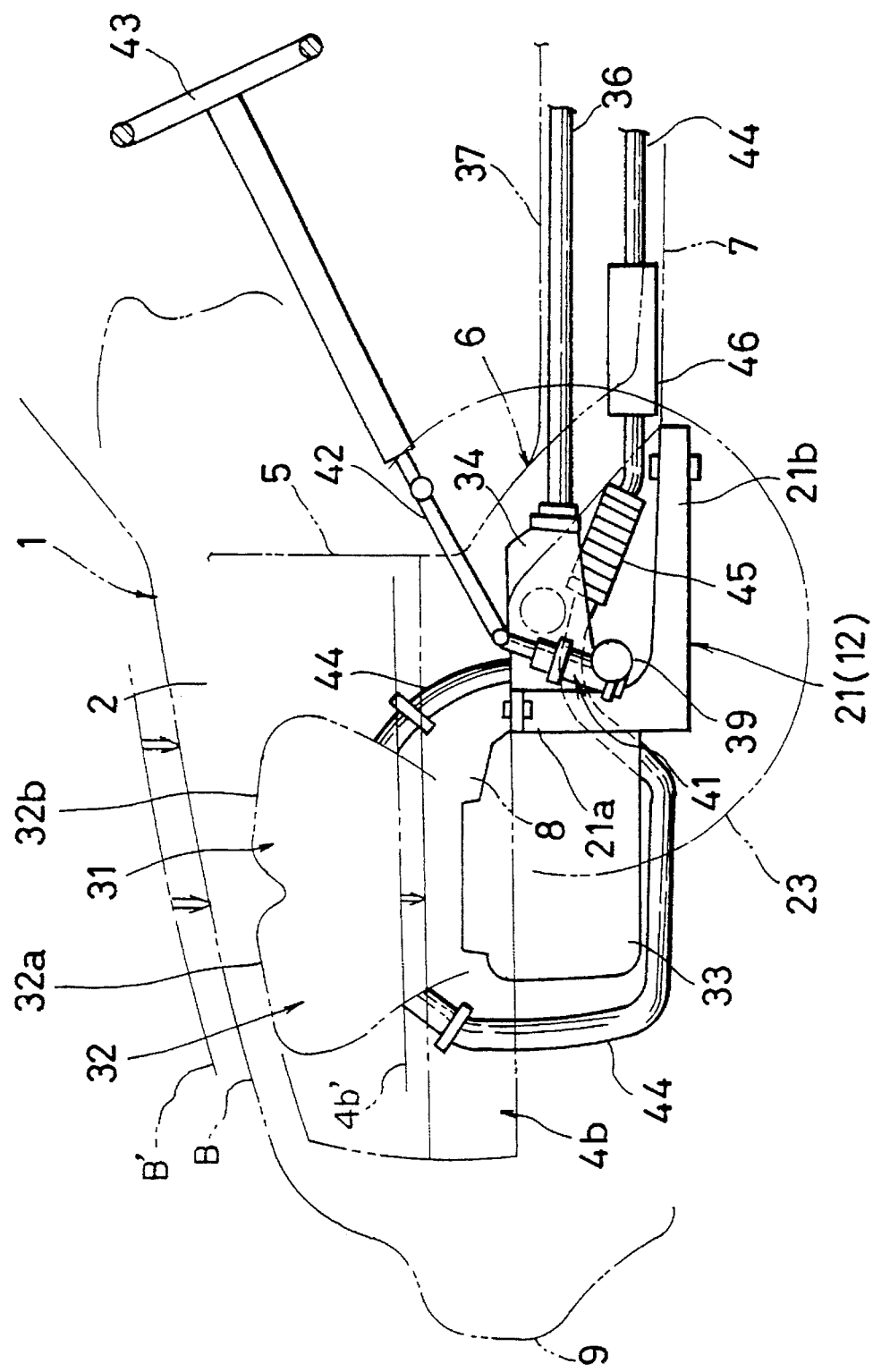
FIG. 13 is a plan view corresponding to FIG. 2, in which the invention is directed to the third embodiment according to the present invention.
Figure 14:
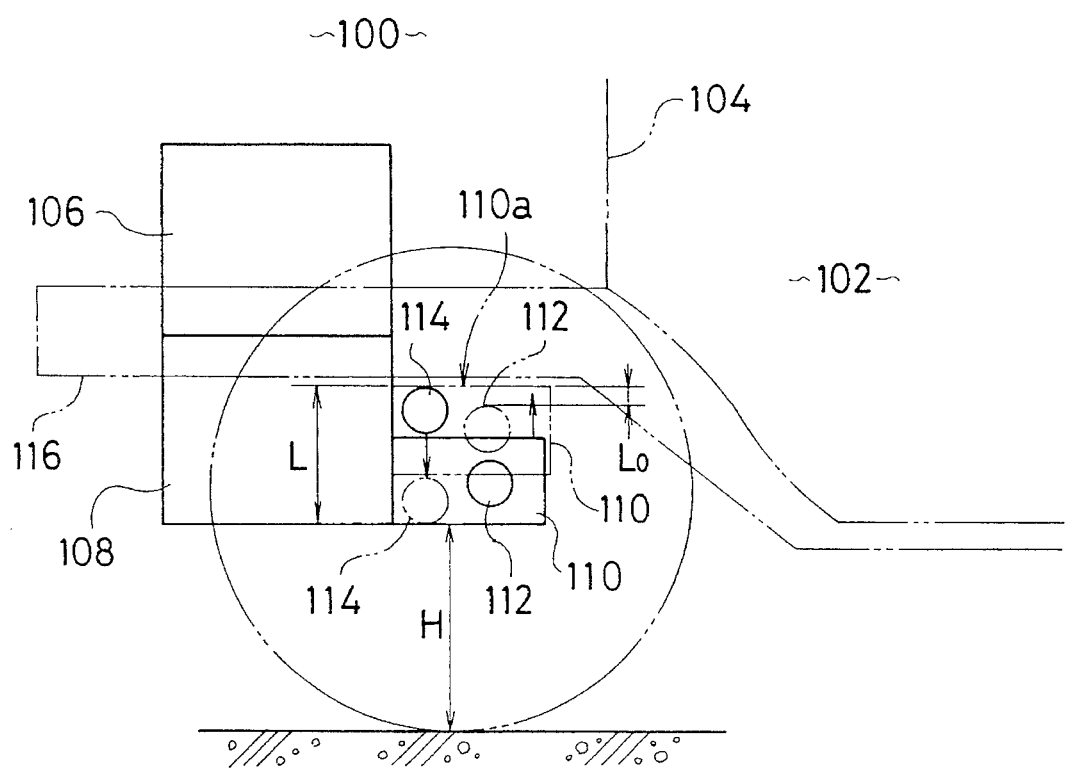
FIG. 14 is a diagrammatic representation for comparing the contents of the present invention with conventional one.

FIGS. 11 to 13 show other embodiments of the engine room structure according to the present invention, in which the same elements are provided with the same reference numerals as the first embodiment as described hereinabove and description of these elements will be omitted.

FIGS. 11 and 12 show the second embodiment wherein the vehicle is of a type in which only the front wheels are driven. For the front-wheel drive vehicle, the V-type engine 32 has the front bank 32a and the rear bank 32b to which the respective exhaust pipings 44 are connected, the exhaust piping for the front bank 32a being referred to as 44a and the exhaust piping for the rear bank 32b being referred to as 44b. The exhaust pipings 44a and 44b are united into the exhaust piping 44 at a middle portion of the engine room and the resulting exhaust piping 44 is disposed extending backwards.

FIG. 13 shows a third embodiment in which the height of each of the front side frames 4a and 4b is so arranged as to be lower than those of the first embodiment and the second embodiment. In other words, the height of the front side frames 4a and 4b in the third embodiment is lowered to the position in which it is located immediately above the front axle 35.

With the arrangement, the disposition of the front side frames 4a and 4b in the lower positions allows a wheel apron, a shroud and so on to be set overall to lower positions, thereby lowering the height of the bonnet B (the bonnet line) than conventional one. It is noted herein that the conventional bonnet line is indicated by reference symbol B' and the height of the conventional front side frames 4a and 4b are indicated by reference alphanumerals 4a' and 4b', respectively.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. An engine room structure of an automotive vehicle, comprising:

a pair of left-hand and right-hand front side frames disposed to left-hand and right-hand side walls of an engine room, respectively;

a power transmission unit interposed between the left-hand and right-hand front side frames;

a front axle so disposed as to associate with the power transmission unit and so to extend from the side portion of the power transmission unit toward the outside of a vehicle body in the transverse direction thereof;

the power transmission superimposed over a steering rack and and exhaust piping extending in a longitudinal direction of the engine room and within a space interposed between the front axle and the steering rack.

2. An engine room structure of an automotive vehicle as claimed in claim 1, wherein:

the power transmission unit has a transfer; and the transfer is disposed in a position higher than the steering rack.

3. An engine room structure of an automotive vehicle as claimed in claim 1, wherein each of the left-hand and right-hand front side frames is arranged as to allow a cross-sectional area of its rear end portion to expand downwards.

4. An engine room structure of an automotive vehicle as claimed in claim 1, wherein each of the left-hand and right-hand front side frames is so arranged as to allow its height to be lowered to a position in the vicinity of the front axle.

5. An engine room structure of an automotive vehicle, comprising:

a power transmission transfer unit disposed in the engine room and superimposed over a steering rack so that said steering rack is closer to a plane defined by points at which wheels of the automotive vehicle contact a common surface than is said power transmission transfer unit.

6. An engine room structure of an automotive vehicle as claimed in claim 5, further comprising a power transmission unit having an engine disposed in a transverse direction of the vehicle body and having an output shaft directed in a longitudinal direction of the vehicle body.

7. An engine room structure of an automotive vehicle as claimed in claim 6, wherein the automotive vehicle is a front-wheel drive vehicle in which front wheels are driven.

8. An engine room structure of an automotive vehicle as claimed in claim 6, wherein the automotive vehicle is a four-wheel drive vehicle in which rear wheels as well as front wheels are driven.

9. An engine room structure of an automotive vehicle as claimed in claim 6, wherein the power transmission unit comprises an engine so disposed as to allow its output shaft to lie in the transverse direction of the vehicle.

10. An engine room structure of an automotive vehicle as claimed in claim 5, wherein the engine is a V-type engine having a forward bank located on the front side in the longitudinal direction of the vehicle body and a rearward bank located on the rear side in the longitudinal direction thereof.

11. An engine room structure of an automotive vehicle as claimed in claim 10, wherein:

an exhaust piping extending from each of the forward bank and the rearward bank of the V-type engine is independent and separate from an exhaust piping for the forward bank and an exhaust piping for the rearward bank; and each of the exhaust pipings for the forward bank and the rearward bank is so disposed as to lie side by side in a transverse direction of the vehicle body through a space interposed between the front axle and the steering rack.

12. An engine room structure of an automotive vehicle as claimed in claim 11, wherein:

exhaust pipings extending from the forward bank and the rearward bank are united into a common exhaust piping; and the common exhaust piping is so disposed as to pass through a space interposed between the front axle and the steering rack.

13. An engine room structure of an automotive vehicle as claimed in claim 1, wherein the automotive vehicle is a front-wheel drive vehicle in which its front wheels are driven.

14. An engine room structure of an automotive vehicle as claimed in claim 1, wherein the automotive vehicle is a four-wheel drive vehicle in which its rear wheels are driven as well as its front wheels are driven.

* * * * *